(12) United States Patent
Lin et al.

(10) Patent No.: US 12,030,791 B2
(45) Date of Patent: Jul. 9, 2024

(54) METHOD TO REGENERATE AN ACTIVATED CARBON FILTRATION MEDIA

(71) Applicant: Glanris, Inc, Olive Branch, MS (US)

(72) Inventors: L-Yu Lin, Cordova, TN (US); Thomas W Volinchak, Memphis, TN (US)

(73) Assignee: GlanRis, Inc, Olive Branch, MS (US)

( * ) Notice: Subject to any disclaimer, the term of this patent is extended or adjusted under 35 U.S.C. 154(b) by 413 days.

(21) Appl. No.: 17/524,413

(22) Filed: Nov. 11, 2021

(65) Prior Publication Data

US 2022/0064023 A1 Mar. 3, 2022

Related U.S. Application Data

(60) Continuation of application No. 16/732,732, filed on Jan. 2, 2020, now Pat. No. 11,235,988, which is a division of application No. 16/415,166, filed on May 17, 2019, now Pat. No. 10,562,792, which is a continuation-in-part of application No. PCT/US2018/018819, filed on Feb. 20, 2018.

(60) Provisional application No. 62/464,009, filed on Feb. 27, 2017.

(51) Int. Cl.
| | |
|---|---|
| *C02F 1/28* | (2023.01) |
| *B01D 39/20* | (2006.01) |
| *B01J 20/20* | (2006.01) |
| *B01J 20/28* | (2006.01) |
| *B01J 20/30* | (2006.01) |
| *C02F 1/42* | (2023.01) |
| *C02F 101/20* | (2006.01) |
| *C02F 101/22* | (2006.01) |
| *C02F 101/30* | (2006.01) |
| *C02F 101/32* | (2006.01) |
| *C02F 103/10* | (2006.01) |
| *C02F 103/36* | (2006.01) |

(52) U.S. Cl.
CPC .......... *C02F 1/283* (2013.01); *B01D 39/2058* (2013.01); *B01J 20/20* (2013.01); *B01J 20/28061* (2013.01); *B01J 20/3078* (2013.01); *B01J 20/3085* (2013.01); *C02F 1/42* (2013.01); *B01J 2220/4875* (2013.01); *C02F 2101/20* (2013.01); *C02F 2101/206* (2013.01); *C02F 2101/22* (2013.01); *C02F 2101/306* (2013.01); *C02F 2101/32* (2013.01); *C02F 2101/322* (2013.01); *C02F 2103/10* (2013.01); *C02F 2103/36* (2013.01); *C02F 2103/365* (2013.01); *C02F 2303/16* (2013.01)

(58) Field of Classification Search
CPC ........ C02F 1/283; C02F 1/42; C02F 2101/20; C02F 2101/206; C02F 2101/22; C02F 2101/306; C02F 2101/32; C02F 2101/322; C02F 2103/10; C02F 2103/36; C02F 2103/365; C02F 2103/16; B01D 39/2058; B01D 39/2062; B01J 20/20; B01J 20/28061; B01J 20/3078; B01J 20/3085; B01J 2220/4875
See application file for complete search history.

(56) References Cited

U.S. PATENT DOCUMENTS

| | | |
|---|---|---|
| 3,392,838 A | 7/1968 | Mark |
| 4,280,912 A | 7/1981 | Berry et al. |
| 4,645,605 A | 2/1987 | Durham |
| 4,676,907 A | 6/1987 | Harrison |
| 4,765,545 A | 8/1988 | Kruining |
| 4,913,808 A | 4/1990 | Haque |
| 5,112,502 A | 5/1992 | Satoh et al. |
| 5,154,828 A | 10/1992 | Schneider et al. |
| 5,770,090 A | 6/1998 | Lewis |
| 5,883,040 A | 3/1999 | Armstrong et al. |
| 6,114,280 A | 9/2000 | Stephens |
| 6,878,193 B2 | 4/2005 | Kasmark, Jr. |
| 7,160,369 B2 | 1/2007 | Blücher et al. |
| 7,514,010 B2 | 4/2009 | Salmon |
| 7,727,398 B2 | 6/2010 | Tanabe |
| 7,989,010 B2 | 8/2011 | Brothers et al. |
| 8,002,993 B2 | 8/2011 | Gold et al. |
| 8,691,173 B2 | 4/2014 | Das et al. |
| 9,290,390 B2 | 3/2016 | Leij et al. |
| 9,682,865 B2 | 6/2017 | Bae et al. |
| 2007/0021300 A1 | 1/2007 | Farant |
| 2007/0090047 A1 | 4/2007 | Bell et al. |
| 2008/0135489 A1 | 6/2008 | Saaski |

(Continued)

FOREIGN PATENT DOCUMENTS

| | | |
|---|---|---|
| CN | 105797693 A | 7/2016 |
| WO | 2011096444 A1 | 8/2011 |
| WO | 2016005928 A1 | 1/2016 |

OTHER PUBLICATIONS

Taha et. al. "Removal of Ni(II), Zn(II) and Pb(II) ions from single metal aqueous solution using activated carbon prepared from rice husk". World Academy of Science, Engineering and Technology 60 (Year: 2011).*

(Continued)

*Primary Examiner* — Liam Royce

(74) *Attorney, Agent, or Firm* — Veritay Group IP PLLC; Susan B. Fentress

(57) ABSTRACT

The inventive subject matter disclosed herein includes multiple novel filter media made of activated rice husks, as well as filtration systems and methods for removing contaminants from an aqueous solution, such as wastewater produced as a byproduct of various industrial processes, including mining, oil and gas exploration and extraction, farming, manufacturing, and the like.

9 Claims, 11 Drawing Sheets

(56) References Cited

U.S. PATENT DOCUMENTS

| | | | |
|---|---|---|---|
| 2009/0065435 A1 | 3/2009 | Li et al. | |
| 2010/0291167 A1* | 11/2010 | Lida | B05D 1/18 |
| | | | 252/62.51 R |
| 2011/0195166 A1 | 8/2011 | Li et al. | |
| 2012/0103915 A1 | 5/2012 | Das | |
| 2013/0256113 A1 | 10/2013 | Tumiatti et al. | |
| 2014/0162873 A1 | 6/2014 | Gu | |
| 2014/0264157 A1 | 9/2014 | Kolomitsyn et al. | |
| 2015/0144564 A1 | 5/2015 | Moller et al. | |
| 2016/0096746 A1 | 4/2016 | Feng | |

OTHER PUBLICATIONS

Abdulrazak, Evaluation of removal efficiency of heavy metals by low-cost activated carbon prepared from African palm fruit, Applied Water Science V. 7, issue 6. 3151-3155 (Sep. 12, 2016).

C. Emanuelle Mendonca Viana et al. "Using Rice Husks in Water Purification in Brazil" Inter J. of Envir. Plan. & Man. 2016 V. 2. No. 3. pp 15-19.

M. Ahiduzzaman et al. "Preparation of Porous-Char and Activated Carbon from Rice Husk by Leaching Ash and Chemical Activation" SpringerPlus (2016) 5: 1248.

PCT Preliminary Report on Patentability dated Dec. 7, 2018.

PCT Written Report dated Apr. 24, 2018.

S. Abdulrazak et al. "Evaluation of removal Efficiency of Heavy Metals by Low cost Activated Carbon Prepared from African Plan Fruit" Appl Water Scp ( 2017) 7: 3151-3155 published on line Sep. 12, 2016.

Saputra, Synthesis and Characterization of Carboxymethyl Cellulose (CMC) from Water Hyacinth Using Ethanol-Isobutyl Alcohol Mixture as the Solvents. Intl J of Chem Engin. And Appli., vol. 5, No. 1 , 26-40 (Feb. 2014 ).

Wahyuni, et al. Characterization of Synthesized Sodium Carboxymethyl Cellulose with Variation of Solvent Mixture and Alkali Concentration., J Med SC. Vo, 7 922) 3878-3881 (2019) Republic of Macedonia.

Wong et al. Removal of Cu and Pb by tartaric acid modified rice husk from aqueous solutions., Chemosphere V. 50 23-29 (2003); Malaysia.

X. Song et al. "Novel Method for Preparing Activated Carbons with High Specific Surface Area From Rice Husk" I&EC Res. 2012, V. 51, 15075-15081.

Xu, Comparison of Rice Husk- and Dairy Manure-derived Bichars for Simultaneous Removing Heavy Metal from Aqueous Solutions: Role of Mineral Components in Biochars. Chemoshere 92 (2013) 955-971.

* cited by examiner

METHOD TO REGENERATE AN ACTIVATED CARBON FILTRATION MEDIA

CROSS REFERENCE TO RELATED APPLICATIONS

This application is a divisional of U.S. application Ser. No. 16/732,732 filed 2020 Jan. 2 and Ser. No. 16/415,166 filed May 17, 2019, now U.S. Pat. No. 10,562,792 a continuation in part of PCT/US2018/018819 application filed 02-20-2018, which claims the benefit of U.S. provisional patent application No. 62/464,009 filed Feb. 27, 2017 (hereby specifically incorporated herein by reference in their entirety).

STATEMENT REGARDING FEDERALLY SPONSORED RESEARCH OR DEVELOPMENT: None.

REFERENCE TO SEQUENCE LISTING, A TABLE FOR A COMPUTER PROGRAM LISTING, COMPACT DISC APPENDIX: None.

The subject matter herein generally relates to the field of water filtration. The subject matter herein more particularly relates to systems, devices, and methods for the removal of toxic compounds during water treatment.

BACKGROUND

Removal of toxic compounds, such as heavy metals, volatile organic compounds (VOCs), semi-volatile organic compounds (SVOCs), pesticides and herbicides, is one of the most difficult challenges in water treatment. Removal of these toxic compounds from wastewater for proper disposal is important for ensuring adequate environmental and public health protective measures are undertaken in order to avoid costly remediation measures as a result of inadequate wastewater treatment processes.

Currently known and utilized processes and materials are limited in their ability to remove the priority pollutants. Additionally, these current solutions are costly, energy intensive, both in the filter media itself and in pumping the contaminated water through the filter media. These current solutions also take up valuable landfill space when the filtration media needs to be disposed after reaching the end of its useful life. The currently prevailing treatment technologies used in treatment of wastewater for heavy metal removal include reverse osmosis (RO), ion exchange resin, activated carbon adsorption, and chemical coagulation and flocculation. However, as will be described further herein below, each of these known technological solutions have many limitations that are addressed by the inventive subject matter disclosed herein.

It is known to use a filtration technology called reverse osmosis for water filtration, and this technology has even been adapted for use in residential water treatment systems. Reverse osmosis filtration systems use a semipermeable membrane to remove contaminants from the liquid being filtered. However, reverse osmosis cannot tolerate the presence of, and is ineffective at removing oil, grease, dissolved dirt and/or silt, and heavy organic materials (e.g., algae, phytoplankton, vegetation debris, and chlorine) from the liquid being processed. In fact, oil, grease, dissolved dirt and/or silt and heavy organic materials will block the reverse osmosis material, such that reverse osmosis would not work when sufficient concentrations of such contaminants are present in a wastewater source. Additionally, reverse osmosis has the additional disadvantage in that it generates 25 percent more in wastewater, from the water that is filtered, such that this wastewater generated must be further processed in some manner.

Another known wastewater treatment technology is ion exchange resin (IER), however this technology has the disadvantage that it also cannot tolerate and is ineffective at removing oils, grease, and organic materials. Additionally, IER must, in order to be effective, be operated at very low flow rates in order to remove the limited contaminants that it is capable of removing. As a result, IER requires a very large volume for effective processing on any sort of industrial scale and requires longer retention time of the water for effective processing. IER also has an extremely high cost associated with its implementation, is dependent on fossil fuels for the raw material for manufacturing the filtration media and has a high cost for disposal of the filtration media, with marginal ability to further process the filtration media for reuse in many applications. Additionally, IER must be regenerated (e.g., refreshed) using toxic acids and chemicals, thereby generating additional wastewater during the clean-up process. As such, the safe disposal and clean-up from an IER filtration system is itself a secondary source of environmental pollution.

Conventional Granular Activated Carbon (GAC) is the most commonly employed filter media in heavy metal removal from wastewater. While the ability of GAC to remove heavy metals has been shown to be only marginally, if at all, successful, GAC is nevertheless widely considered to be the best media for their removal. However, GAC cannot be used to remove oil or grease but is effective to remove organic and inorganic chemicals from wastewater. As is already known, GAC is typically manufactured from a source material of rice husk, coconut shells, animal bones, and/or clam shells. This source material is first pulverized and then incinerated into ash (e.g., small particles) before final treatment with toxic chemicals in order to produce the resultant GAC product. The small particle size is easily clogged by pollutants, thus making this approach unsuccessful. Due to the energy consumption and time required to produce GAC for use in a filter media, GAC is also a very costly media. Additionally, the manufacturing process used in making GAC remains expensive and the cost is actually becoming higher over time because of the inflation of raw material costs.

Chemical treatments, such as treatments using coagulants, are time consuming, expensive, imprecise, and require large volumes of equipment for the containment of the wastewater for treatment, mixing of the chemical treatment, settling of the contaminants drawn from the solution, and drying of these contaminants. Each of these chemical treatment processes also consume comparatively vast amounts of energy for pressing out excess water and drying, by heating and/or convectively evaporating the water from the removed contaminants, the contaminants removed during treatment. Furthermore, the dried "cake" of contaminants is heavy, expensive to transport for disposal, and does not easily lend itself to recovering the potentially valuable resources contained therein, which were previously contaminants in the wastewater before the treatment thereof.

Additionally, according to the known filtration solutions using reverse osmosis, GAC, and chemical treatments, such filtration techniques require hydraulic systems to force the wastewater through the treatment units. The energy consumed in overcoming the head pressure losses inherent in such systems is significant, adding to the expense associated with such treatment techniques. Regardless of the filtration technologies used, waste, whether a secondary wastewater from reverse osmosis, spent filter media from GAC or IER, or the contaminant "cake," is generated and must be further processed or disposed of. When a filtration media is spent (e.g., sufficiently saturated with filtrate so as to no longer be an effective filter), this spent filtration media must be buried in a landfill, further adding to the expense associated therewith. Furthermore, this waste byproduct, whether spent filtration media, wastewater, or the contaminant "cake," itself becomes a potential environmental hazard if not adequately disposed of.

As such, there exists a strong commercial, as well as environmental, need to develop improved and alternate filtration media, filtration systems, and filtration methods, having improved efficacy and lower associated costs in removing toxic contaminants from wastewater.

SUMMARY OF THE INVENTION

The inventive subject matter disclosed herein includes an activated carbon filtration media configured to remove contaminants from water. The activated carbon filtration media product being made of an intact non-particulate charred rice husk not having a silicon content greater than 40 percent, as well as filtration systems and methods for removing contaminants from an aqueous solution, such as wastewater produced as a byproduct of various industrial or pharmaceutical processes, including mining, oil and gas exploration and extraction, farming, and manufacturing. Additionally, the filter media can be used to treat drinking water or for the pretreatment of water for industrial uses. In one aspect, the invention includes an activated carbon filtration media product configured to remove contaminants from water, particularly water containing one or more of heavy metals, oils, ions, greases, VOCs, SVOCs, pesticides, and herbicides or other contaminants.

The filtration media product is made of: a charred rice husk not having a silicon content greater than 40 percent, the product made by the process including the steps of: providing an organic fiber material; exposing the organic fiber material to a heat source; heating the organic fiber material to a temperature of between about 250° C. and about 550° C. in order to char, at least partially, the organic fiber material; removing the organic fiber material from the heat source; and cooling the organic fiber material to an ambient temperature to make the activated carbon filtration media product.

In another aspect, the invention includes filter for removing contaminants from water, particularly wastewater containing one or more of heavy metals, oils, greases, VOCs, SVOCs, pesticides, and herbicides, the filter having a housing having at least one inlet and at least one outlet, and a filtration media.

In still another aspect, the invention includes a filtration system configured to remove contaminants from water, the filtration system having at least one filter; at least one water tester at an outlet of at least one of the at least one filter; and at least one valve for directing a fluid flow into one or more of the at least one filters.

More specifically, the novel subject matter includes a filtration system configured to remove contaminants from water. The filtration system is made of: a first activated carbon filtration media product, a first water tester at an outlet of first activated carbon filtration media product; and at least one valve for directing a fluid flow into the first activated carbon filtration media product, the first activated carbon filtration media product has a first level water tester arranged at an outlet thereof; and a second activated carbon filtration media product, a second first level water tester at an outlet of second activated carbon filtration media product; and at least one valve for directing a fluid flow into the second activated carbon filtration media product, wherein the second carbon filtration media product, wherein the first activated carbon filtration media product and the second activated carbon filtration media product are arranged in parallel with respect to each other; and wherein the water flows into an inlet of the first activated carbon filtration media product or the second activated carbon filtration media product.

In still another aspect, the invention includes a method to reduce the contaminants level in wastewater including the steps of: pumping wastewater to a filter device made of a at least one activated carbon filtration media product wherein the media product, to provide filtered water; testing the filtered water for contaminants; and routing the filtered water to second filtration media product to provide filtered water with a lower percentage of contaminants Although some of the aspects of the subject matter disclosed herein have been stated hereinabove, and which are achieved in whole or in part by the presently disclosed subject matter, other aspects will become evident as the description proceeds, when taken in connection with the accompanying drawings as best described hereinbelow.

DETAILED DESCRIPTION

Figure 1:
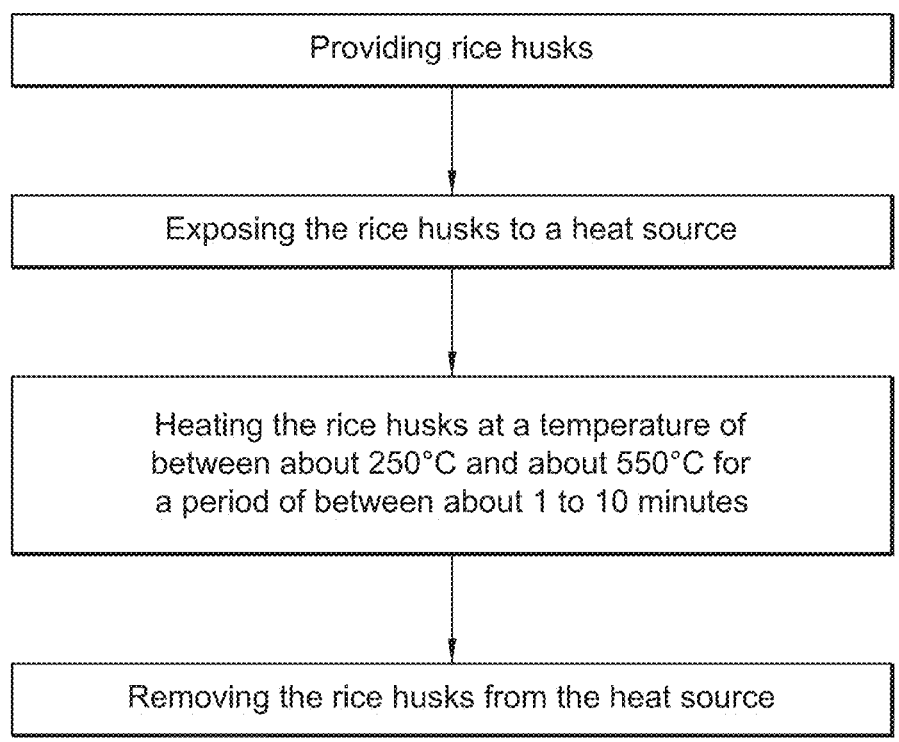
FIG. 1 is a flow chart for a method of producing a first example embodiment of a filtration media, in accordance with the disclosure herein.

The terminology used herein is for the purpose of describing particular embodiments only and is not intended to be limiting of the presently disclosed subject matter. While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one skilled in the art. In describing the presently disclosed subject matter, it will be understood that a number of techniques and steps are disclosed. Each of these has individual benefit and each can also be used in conjunction with one or more, or in some cases all, of the other disclosed techniques.

Accordingly, for the sake of clarity, this description will refrain from repeating every possible combination of the individual steps in an unnecessary fashion. Nevertheless, the specification and claims should be read with the understanding that such combinations are entirely within the scope of the invention and the claims. Following long-standing patent law convention, the terms "a", "an", and "the" refer to "one or more" when used in this application, including the claims. Thus, for example, reference to "a cell" includes a plurality of such cells, and so forth. Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter. As used herein, the term "about," when referring to a value or to an amount of a composition, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim. As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole. As used herein, the phrase "consisting essentially of" limits the scope of a claim to the specified materials or steps, plus those that do not materially affect the basic and novel characteristic(s) of the claimed subject matter. With respect to the terms "comprising", "consisting of", and "consisting essentially of", where one of these three terms is used herein, the presently disclosed and claimed subject matter can include the use of either of the other two terms. As used herein, the term "and/or" when used in the context of a listing of entities, refers to the entities being present singly or in combination. Thus, for example, the phrase "A, B, C, and/or D" includes A, B, C, and D individually, but also includes any and all combinations and sub-combinations of A, B, C, and D.

Figures (also "FIGS.") 1 through 11 show various example embodiments of filtration systems, methods of manufacturing filtration media, and methods of removing contaminants from a water source. The water source can include: pre and post treatment of industrial wastes; pre and post treatment of pharmaceutical manufacturing processes; municipal treatment of water; and residential treatment of potable and storm water.

In general, most wastewater contaminated with heavy metal contaminants will have such heavy metals present, including particulate and dissolved heavy metal contaminants. While the level of contamination can vary widely, most wastewater sources needing treatment will have heavy metal contaminant concentration levels ranging from about 1 to about 1,000 parts per million (ppm). The carbon content of rice husks is a major chemical component in the chemical composition thereof. Typically, rice husk has a chemical composition similar to that of many common organic fibers, having, before processing, 40-50% cellulose content, 25-30% lignin content, 15-20% ash content, and 8-10% moisture content. It should be noted that other organic fiber materials may be used in lieu of rice husks without deviating from the scope of the present invention. Some examples of other suitable organic fibers include, without limitation, peanut shells, sunflower seed shells, and/or pumpkin seed shells. Rice husks have a general size (e.g., length) ranging from about 0.5 mm to about 5 mm, however rice husks having sizes outside of this range are also suitable for processing to use as filtration media. Upon processing the charred organics fibers form an activated carbon media suitable to remove contaminants from wastewater.

A first example embodiment of a method of manufacturing an activated carbon filtration media 901X from rice husks is shown generally in the flow chart of FIG. 1. A first step of this first method includes placing rice husks in an enclosed space. In some respects, the enclosed space is very large and contains various equipment (e.g., a conveyor belt system, a series of trays, etc.) capable at operating at high temperatures in order to produce a large volume of the activated rice husks. A second step then includes removing oxygen from the enclosed space in which the rice husks are contained to create a limited oxygen condition therein (e.g., so that oxygen is less than about two percent of the atmosphere present during pyrolysis), charring the rice husks via a heater for a period of time, and removing the charred rice husks from the enclosed space. The charring of the rice husks is accomplished by elevating the temperature of the rice husks to between about 250° C. to about 550° C. for a period of about 1 to 10 minutes. It is particularly preferred for the temperature of the rice husks to be elevated to a temperature of about 400° C. for a period of about 1 minute, but not to a temperature or length of heating to develop ash. This condition can be verified by having no more than 40 percent silicon content in the media, but preferably between 25-40 percent silicon content. The activated carbon filtration media of the present invention are charred organic non-particulate fibers having the following physical properties.

TABLE 1

Physical Properties of Activated Carbon Filtration Media

|  | Range | Unit |
| --- | --- | --- |
| Bulk Density | 0.7-0.9 | g/cm$^3$ |
| Solid Density | 1.2-2.0 | g/cm$^3$ |

TABLE 1-continued

Physical Properties of Activated Carbon Filtration Media

| | Range | Unit |
|---|---|---|
| Size | 0.5-5 | mm |
| Surface Charge Density | 0.01 | Columbus/cm² |
| Porosity | 0.4-0.55 | |
| Specific Surface Area | 200-400 | m²/g |
| pH (operation) | 4-10 | |
| Silt Density Index | 30-100 | μm |

During me charring process, the surface area of the rice husks forms activated rice husks made of microporous mesh structures suitable for capturing and removing particulate metals passing through a filter containing the activated carbon filtration media. These metals filtered by the activated carbon can be removed through an adsorption process, thereby enabling reuse of the filtration media.

Figure 2:
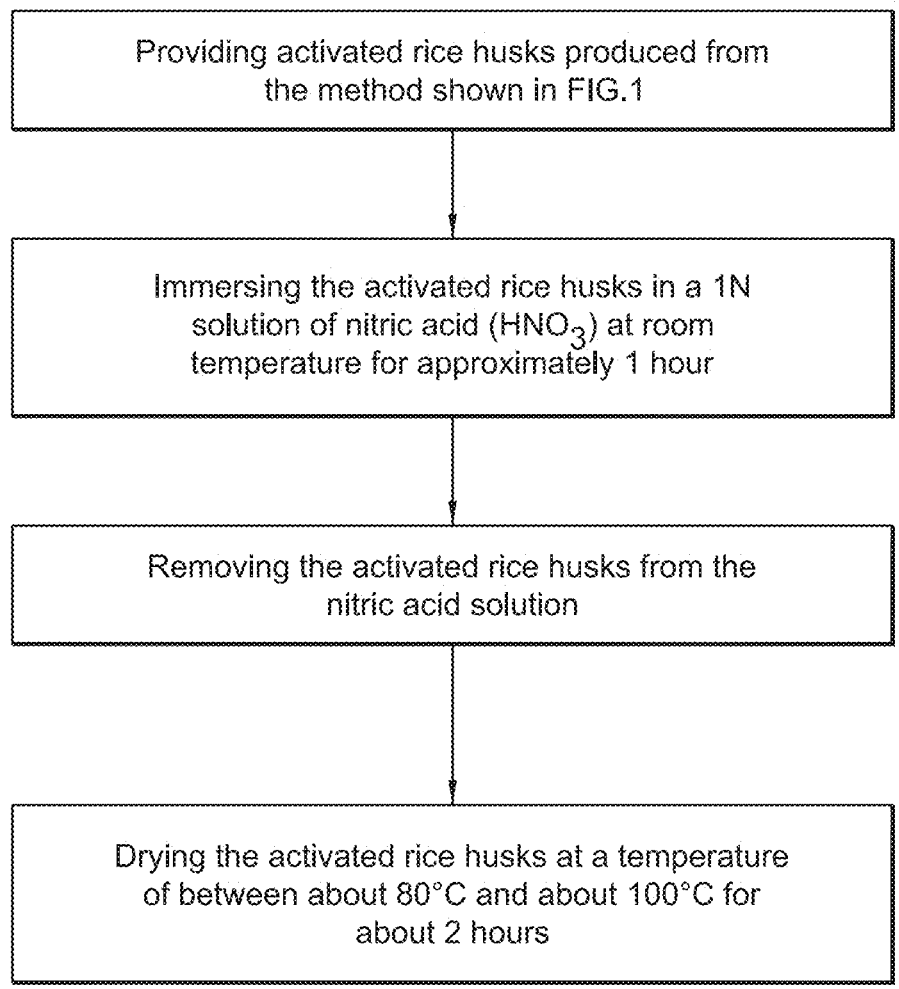
FIG. 2 is a flow chart for a method of producing a second example embodiment of a filtration media, in accordance with the disclosure herein.
Figure 11:
FIG. 11 is a black and white photograph of an intact rice husk that makes up an activated carbon filtration media, namely 901Y at magnification.

A second example embodiment of a method of manufacturing a second activated carbon filtration media 901Y is shown generally in the flow chart of FIG. 2. A first step of this second method includes immersing the activated rice husks 901X in a solution of 1 N nitric acid ($HNO_3$) at room temperature (e.g., approximately 25° C.) for approximately one hour. A second step includes removing the activated rice husks 901X from the nitric acid solution. A third step involves drying the acid-treated rice husks at a temperature from about 80-100° C. for a period of approximately 2 hours. The result of the acid treatment is that the corrosive effect of the acid on the activated rice husks 901X further degrades the structure of the activated rice husks, with this degradation being in the form of making the surface rougher and increase the micro-porosity characteristics and effective surface area of the activated rice husks 901X. In some embodiments, the increase in effective surface area is approximately 15-20 percent or more. The physical properties of 901Y activated carbon filtration media is similar to 901X activated carbon filtration media. Through the nitric acid process, activated rice husks will have more porous and surface area. In general, the surface area of treated rice husks will increase to 15-20 percent more as compared to 901X media, approximately 500 m²/g. Referring to FIG. 11, the intact non-particulate rice husk that makes up the activated carbon filtration media 901Y is shown at magnification.

TABLE 2

The adsorption capacity of 901X and 901Y

Figure 3:
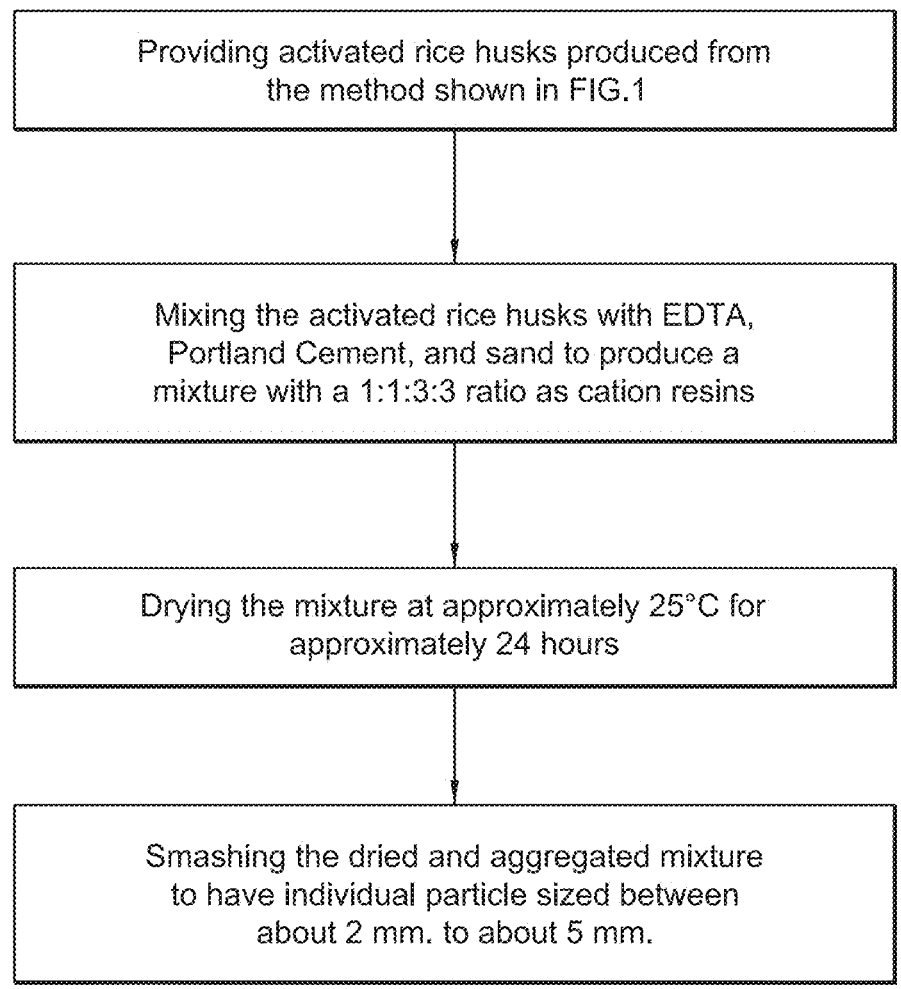
FIG. 3 is a flow chart for a method of producing a third example embodiment of a filtration media, in accordance with the disclosure herein.

Cu = 10 mg/g 901X-901Y
Zn = 4 mg/g 901X-901Y
Ni = 12 mg/g 901X-901Y
Pb = 7 mg/g of 901X-901Y
Cr = 5 mg/g of 901X-901Y
First Pseudo-Kinetic of Cr = initial 7 mg/l: Log (qe – qt) = Log qe – K*t
K = 0.05 1/min A third example embodiment of a method of manufacturing a third activated carbon filtration media 901Z is shown generally in the flow chart of FIG. 3. A first step includes mixing the heat activated rice husks 901X with Ethylenediaminetetraacetic acid (EDTA, $C_{10}H_{16}N_2O_8$), Portland Cement (CaO), and sand in a 1:1:3:3 ratio (e.g., 1 part EDTA, 1 part activated rice husk 901X, 3 parts CaO, and 3 parts sand) as Cation Resins. A second step includes drying the mixture at room temperature (e.g., 25° C.) for approximately 24 hours. In an alternate embodiment, the second step includes heating the mixture produced from the first step to a temperature of between approximately 80-100° C. for 10-14 hours. It is also possible for intermediate combinations of elevated temperatures and time periods to be selected, using more moderate temperatures for time periods less than 24 hours. A third step includes pulverizing the dried and aggregated mixture obtained from the second step to have individual particle sizes in the range of approximately 2-5 millimeters (mm).

Figure 4:
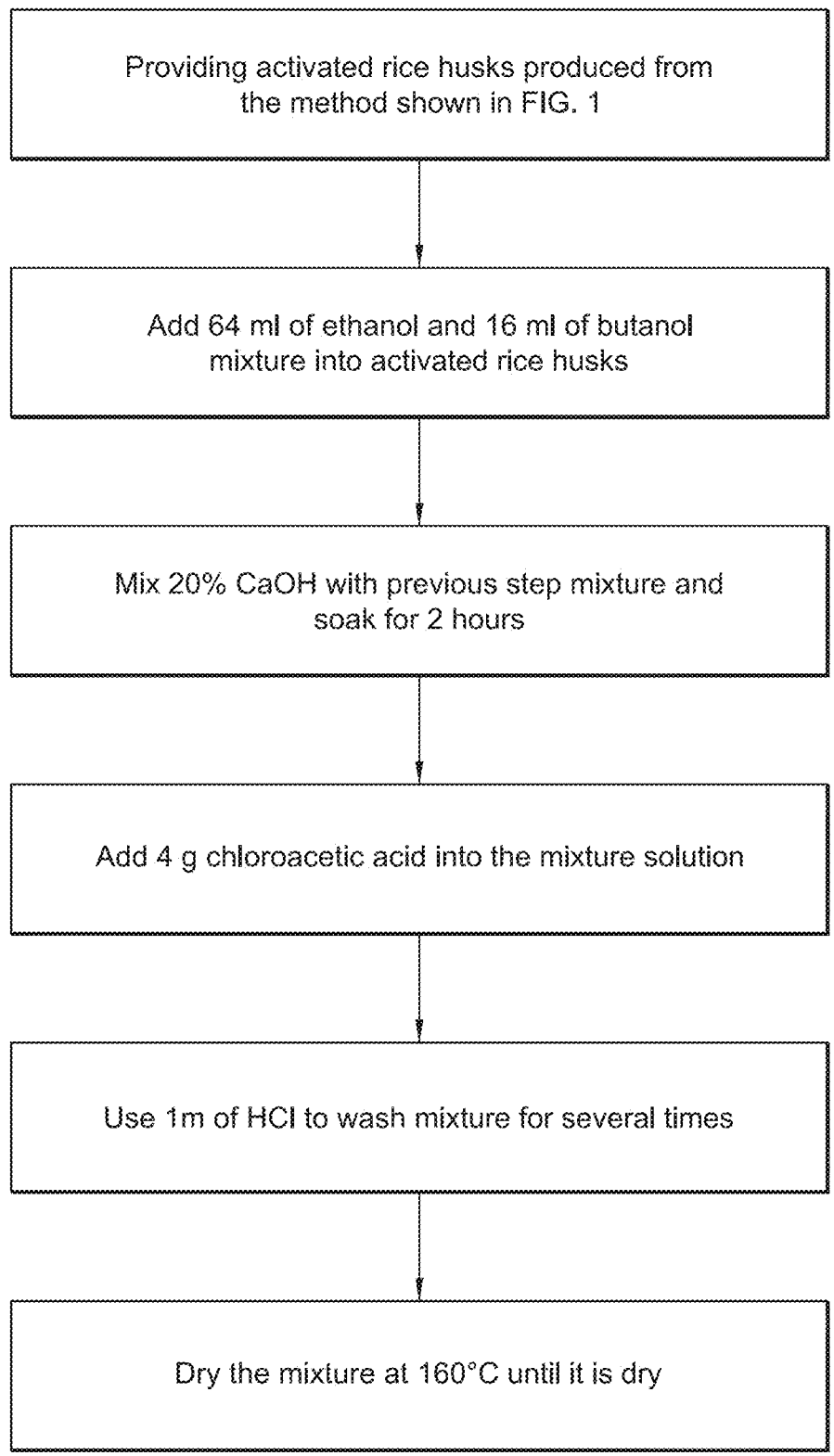
FIG. 4 is a flow chart for a method of producing a fourth example embodiment of the filtration media, in accordance with the disclosure herein.

A fourth example embodiment of a method of manufacturing an activated carbon filtration media 901-alpha (or 901-a) from rice husks is shown generally in the flow chart of FIG. 4. First, provide the activated rice husk according to the process shown in FIG. 1. In one exemplary example 5 grams of activated rice husk is mixed with 80/20 v/v mix of ethanol/butanol to activate the rice husks. Next 20 percent by weight of a salt such as CaOH is added to the mixture to attach to the surface of the rice husk and the mixture soaks for about two hours at room temperature. The calcium is the cation in the exchange resin. Next a weak acid such as 4 grams of Chloroacetic acid ($ClCH_2CO_2H$) is added to the mixture to affix the calcium to the rice husk. The mixture is washed with a strong acid, such as 1 N Hydrochloric acid (HCl) to firmly attach the compounds to the surface of the rice husk and then dried at about 160° C. (150-170° C.) for several hours to form the activated carbon filtration media 901-alpha.

TABLE 3A

Activated Carbon Filtration Media 901-alpha Physical Properties

| | Range | Unit |
|---|---|---|
| Bulk Density | 0.4-0.5 | g/cm³ |
| Solid Density | 1.1-1.6 | g/cm³ |
| Size | 0.1-2 | mm |
| Surface Charge Density | 0.01 | Columbus/cm² |
| Porosity | 0.4-0.55 | |
| Specific Surface Area | 400-500 | m²/g |
| pH (operation) | 4-10 | |
| Silt Density Index | 50 | μm |

TABLE 3B

The ion exchange capacity of 901-alpha

Cu = 13 mg/g of 901-alpha
Zn = 5.4 mg/g of 901-alpha
Ni = 16.3 mg/g of 901-alpha
Pb = 8.6 mg/g of 901-alpha
Cr = 55.8 mg/g of 901-alpha It is noted that the entire processing of the embodiments of the activated rice husk filtration media 901X, 901Y, 901Z and 901-alpha consumes far less energy and requires a significantly lower investment in system maintenance than is required for either conventional GAC, IER, and/or chemical treatments described above. Furthermore, the spent, contaminated rice husk filtration media, whether 901X, 901Y, 901Z and 901-alpha, occupies far less volume in a landfill compared to either conventional GAC and reverse osmosis filtration media, due to the inherent ability of the activated rice husks to be compacted greatly during disposal, with compaction ratios generally in the range of about 3:1 to about 5:1, compared to GAC, which is very hard and incapable of being significantly compacted. In some embodiments, the compaction ratios have been seen to be as high as about 10:1. This ability to compact the spent filtration media 901X, 901Y, 901Z and 901-alpha results in less landfill space being occupied and makes the spent filtration media 901X, 901Y, 901Z and 901-alpha easier and cheaper to transport for disposal. Furthermore, before compaction, some metals can be recovered and reused by conventionally known extraction and leaching processes.

Figure 5:
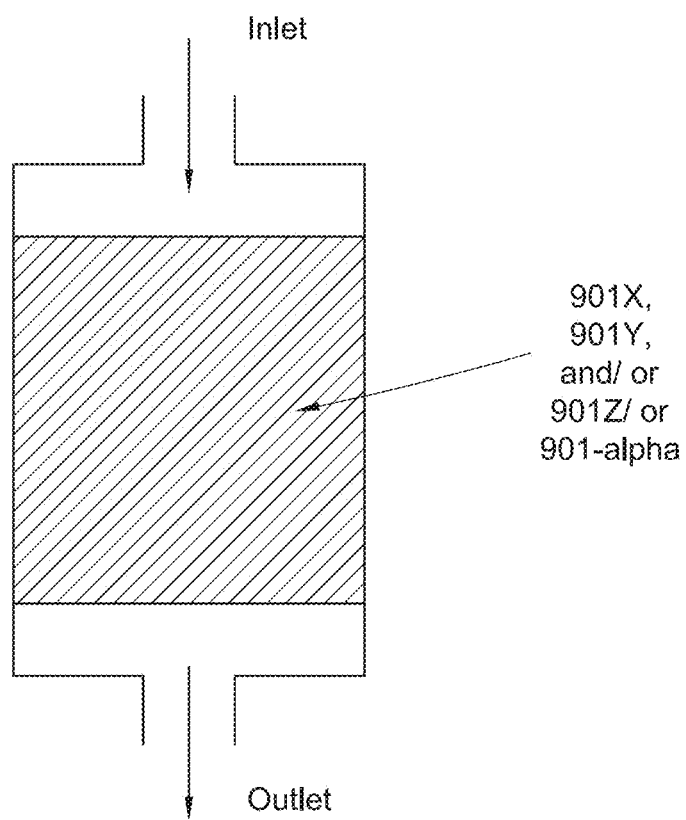
FIG. 5 is a schematic illustration of an example embodiment of a filter device, in accordance with the disclosure herein.

Referring now to FIG. 5, a single filtration device using the activated rice husk filtration media 901X, 901Y, 901Z and 901-alpha generated from the respective methods described hereinabove is shown. As can be seen in FIG. 5, the activated rice husks 901X, 901Y, 901Z and 901-alpha are packaged in a housing, filling at least a majority of the internal volume thereof. In some embodiments the activated rice husks are packaged so as to achieve a filtration media density of between approximately 0.7 to approximately 2.0 pounds per cubic foot (lb/ft$^3$). It should be noted that this compares quite favorably to the densities required for a filtration device using GAC, which must be packaged at a density of 125 to 130 lb/ft$^3$. As such, the single filtration device of FIG. 5 has a much lower mass and is much more easily assembled and installed in comparison to a filtration device using GAC, as is conventionally known. The housing may be made of any suitable material capable of withstanding the normal working pressures contained within, such as any suitable plastics or metals. The housing further has fittings for inlet and outlet tubing, preferably on the ends of the housing, to allow an inflow of wastewater and an outflow of treated water. The fittings at the inlet and outlet of FIG. 5 are shown only schematically, but can be of any suitable type, including, for example, threaded, barbed, quick connect, slip-type, or adhesive joints to accommodate all types of tubing or piping appropriate for the type of contamination being treated.

The filtration devices which are filled with the activated rice husk filtration media require no excess pumping energy to force the wastewater through the media beyond that which is necessary to pump the wastewater to the filtration devices. In other words, the filtration media 901X, 901Y, 901Z and 901-alpha are effective at nominal pressures and do not require high operating pressures in order to be effective. This allows for less rugged and robust filter housings to be used, as there is minimal internal pressure that the housing must be designed to withstand. In other aspects, the wastewater can be pumped through the filtration media 901X, 901Y, 901Z and 901-alpha at higher pressures to speed the filtration process.

While each of the activated rice husk filtration media 901X, 901Y, 901Z and 901-alpha are effective at filtering out contaminants in the form of, for example, heavy metals, oils, greases, VOCs, SVOCs, pesticides, and herbicides each filtration media is best suited to remove one or more of these contaminants over others of the classes of contaminants. As such, the filtration media 901X is best suited for filtration of oil, and dissolved metals; the filtration media 901Y is best suited to filter out suspended solids, metals, as well as neutralization, oil, and particulate metals. The filtration media 901Z is best suited to filter out and recuperate metals. 901-alpha is a type of ion exchange resin that is suitable for capturing metals in a short period of time. The media is easy to regenerate and reuse. For environmental and sustainability aspects, this media will reduce sludge cake production after treatment. As can be seen above, there is some degree of overlap in the classes of contaminants that each of the various filtration media 901X, 901Y, 901Z and 901-alpha are best suited to remove.

Figure 6:
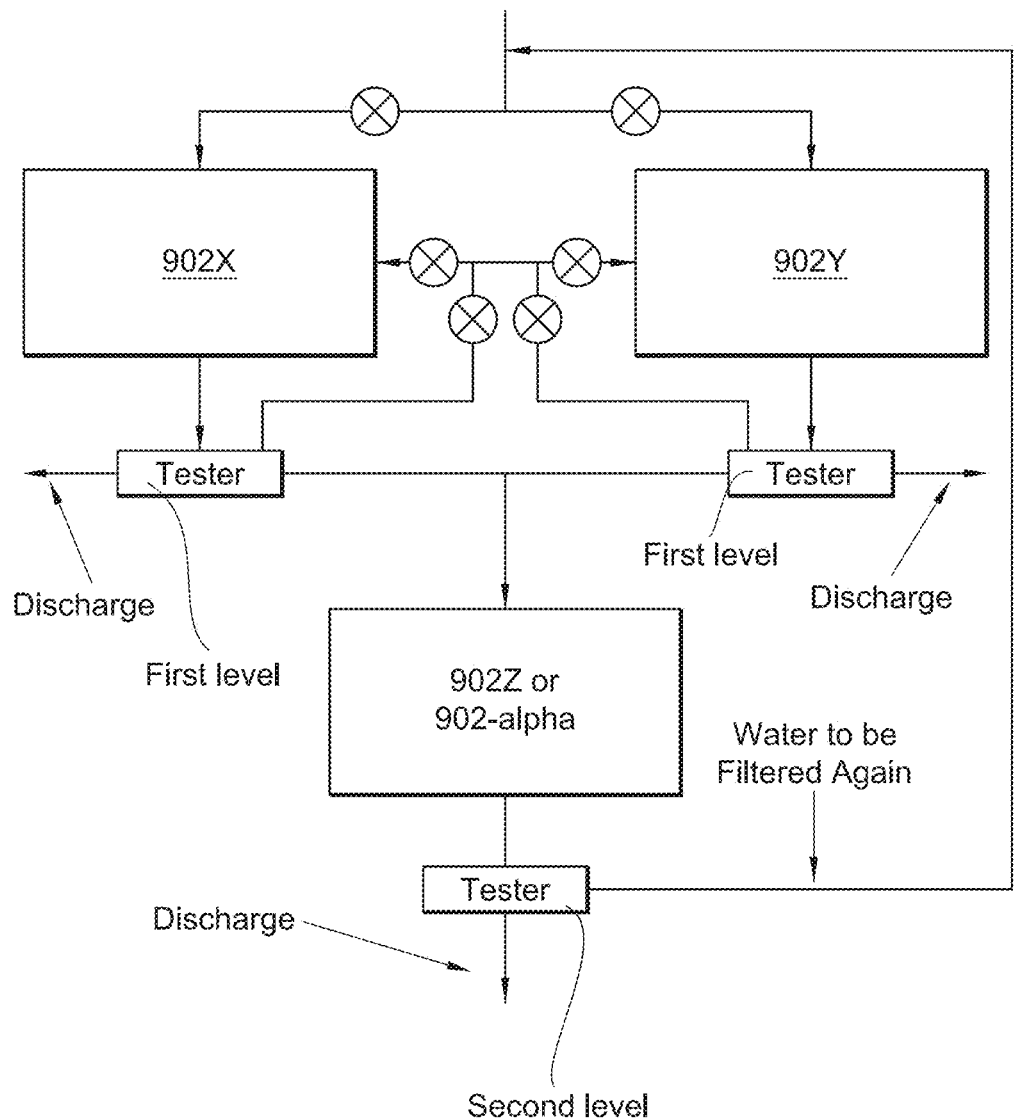
FIG. 6 is a first example embodiment of a filtration system, in accordance with the disclosure herein.

Referring now to FIG. 6, an example embodiment of a filtration system is shown schematically. This filtration system has a plurality of filtration devices, as were described and illustrated relative to FIG. 5. These filtration devices are interconnected by a plurality of pipes, or any suitable analogue therefor, with a plurality of valves and water testers arranged within the filtration system. In some respects, the water testers are atomic absorption spectrometers, but other types of water testers will be readily understood by those having ordinary skill in the art.

As is illustrated by the arrows in FIG. 6, water flows into the system and, depending on the type of contaminant being treated, either the valve leading to the inlet of the filter 902X having filtration media 901X or the valve leading to the inlet of the filter 902Y having filtration media 901Y is opened to allow a flow into the desired filter device 902X or 902Y as a first stage filter. The operation of all valves can be controlled and actuated manually or via a computer and a suitable actuator (e.g., electromagnetic, pneumatic, etc.); additionally, the valves may be controlled manually (e.g., by a person pressing a button) but opened by a suitable actuator, as noted above. In some embodiments, the valve between filter 902X and filter 902Y may be opened, so that wastewater will flow into filter 902X and then into filter 902Y, or the opposite thereof. In other embodiments, where dual stage filtration using both types of filtration media 901X and 901Y is not needed, the treated water will exit the respective filters 902X or 902Y and will enter into a water tester, which will compare the level of contaminants remaining in the wastewater after this first stage of treatment against a specified allowable level of contaminants. Depending on the results, the water tester will either discharge this "clean" water or, if the water needs further filtration, will route the treated water to the filter 902Z/902-alpha with filtration media 901Z. After passing through filter 902Z/902-alpha, the discharged water is tested again by a second water tester against a specified threshold for the contaminant concentration in the water. If the contamination level of the water exiting filter 902Z/902-alpha is below the specified threshold concentration level, the water is discharged, but if not then the water is routed back to the inlet of the filtration system.

Figure 7:
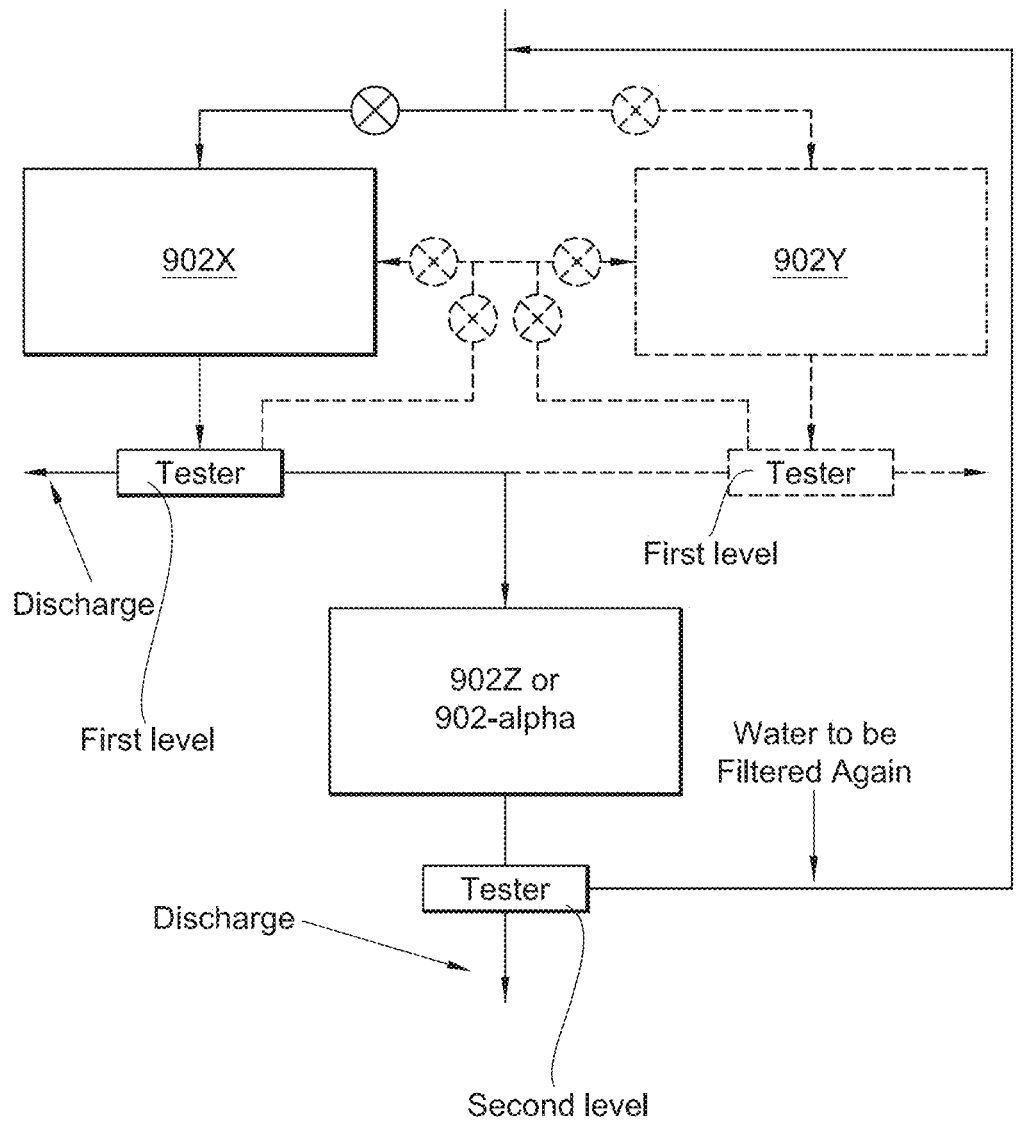
FIG. 7 is a second example embodiment of a filtration system, in accordance with the disclosure herein.

In the example embodiment of a filtration system illustrated in FIG. 7, contaminated wastewater with high concentration levels of oil and dissolved heavy metals enter the filtration system and are routed to the inlet of filter 902X. After passing through filter 902X, the water is tested by a water tester. If the water contamination level is below a specified threshold concentration level, this "clean" water is discharged. If the concentration level of contaminants remains above the threshold, then the water is routed to the inlet of filter 902Z/902-alpha for a second stage of filtration. After the second stage filtration in filter 902Z/902-alpha, the water is tested again in a second level water tester. As was described above, if the water contamination level is below a specified threshold concentration level, this "clean" water is discharged. If the concentration level of contaminants remains above the threshold, then the water is routed back to the inlet of the filtration system. In the illustration of FIG. 7, broken lines are used to illustrate flow paths that are inactive, with no fluid flowing therethrough as a result of the configuration of the valves in the example filtration system being illustrated.

Figure 8:
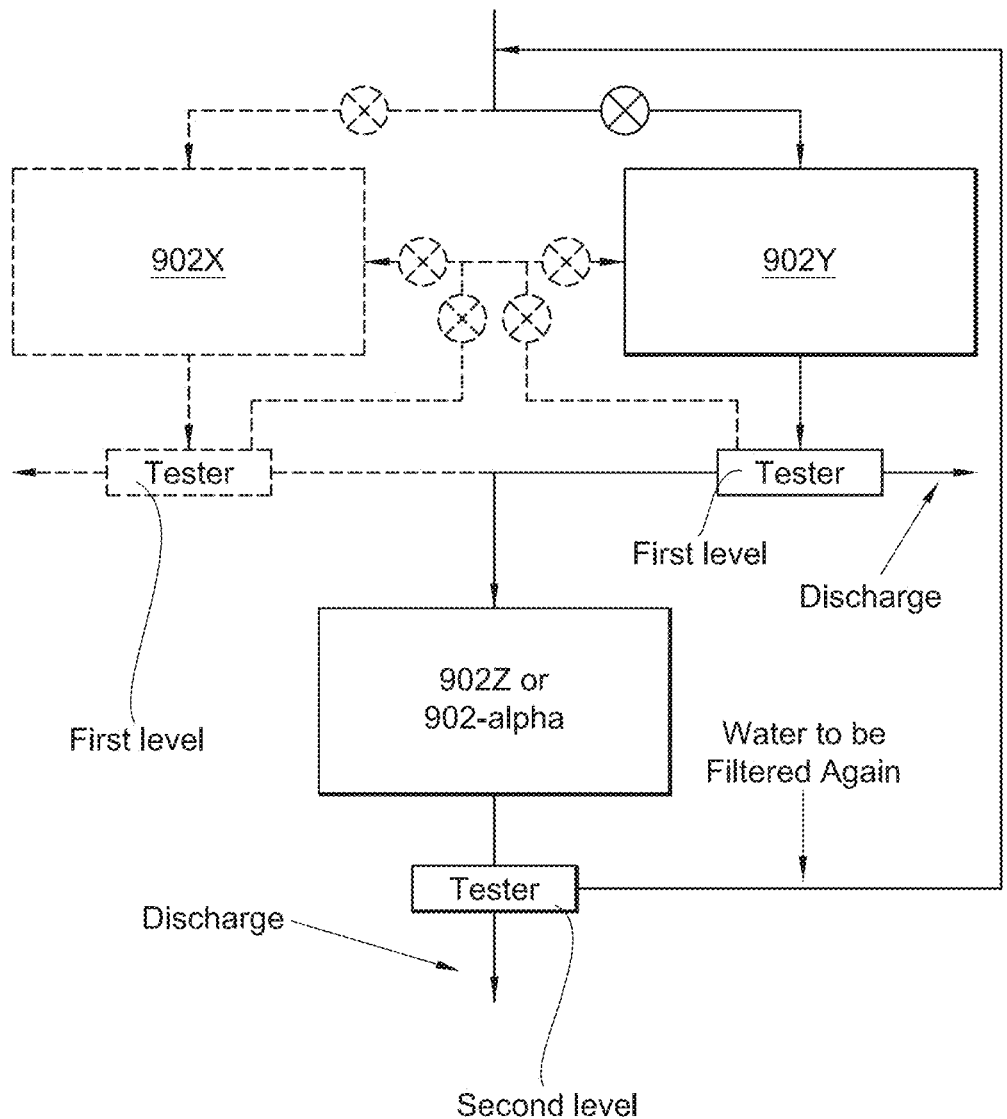
FIG. 8 is a third example embodiment of a filtration system, in accordance with the disclosure herein.

In the example embodiment of a filtration system illustrated in FIG. 8, contaminated wastewater having high concentration levels of suspended solids, particulate metals, or color is routed by the inlet valve to the inlet of filter 902Y for a first stage of filtration. After exiting the first stage of filtration in filter 902Y, the treated water is tested in a water tester at the outlet of filter 902Y. If the water contamination level is below a specified threshold concentration level, this "clean" water is discharged. If the concentration level of contaminants remains above the threshold, then the water is routed to the inlet of filter 902Z/902-alpha for a second stage of filtration. After the second stage filtration in filter 902Z/902-alpha, the water is tested again in a second water tester. As was described above, if the water contamination level is below a specified threshold concentration level, this "clean" water is discharged. If the concentration level of contaminants remains above the threshold, then the water is routed back to the inlet of the filtration system. In the illustration of FIG. 8, broken lines are used to illustrate flow paths that are inactive, with no fluid flowing therethrough as a result of the configuration of the valves in the example filtration system being illustrated. This system can be further modified by adding filter 901-alpha. With this replacement filtration media the system can be used for metal removal.

Figure 9:
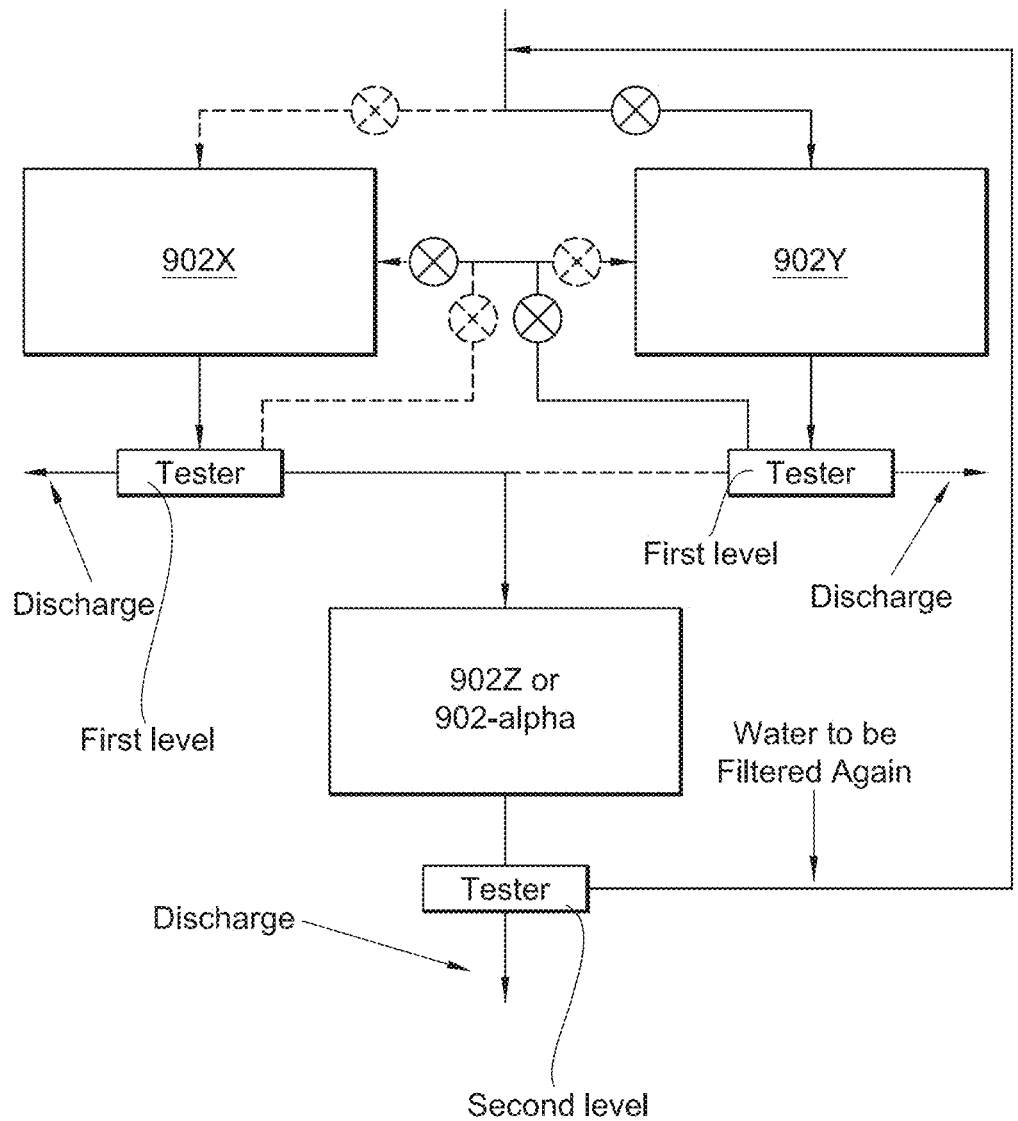
FIG. 9 is a fourth example embodiment of a filtration system, in accordance with the disclosure herein.
Figure 10:
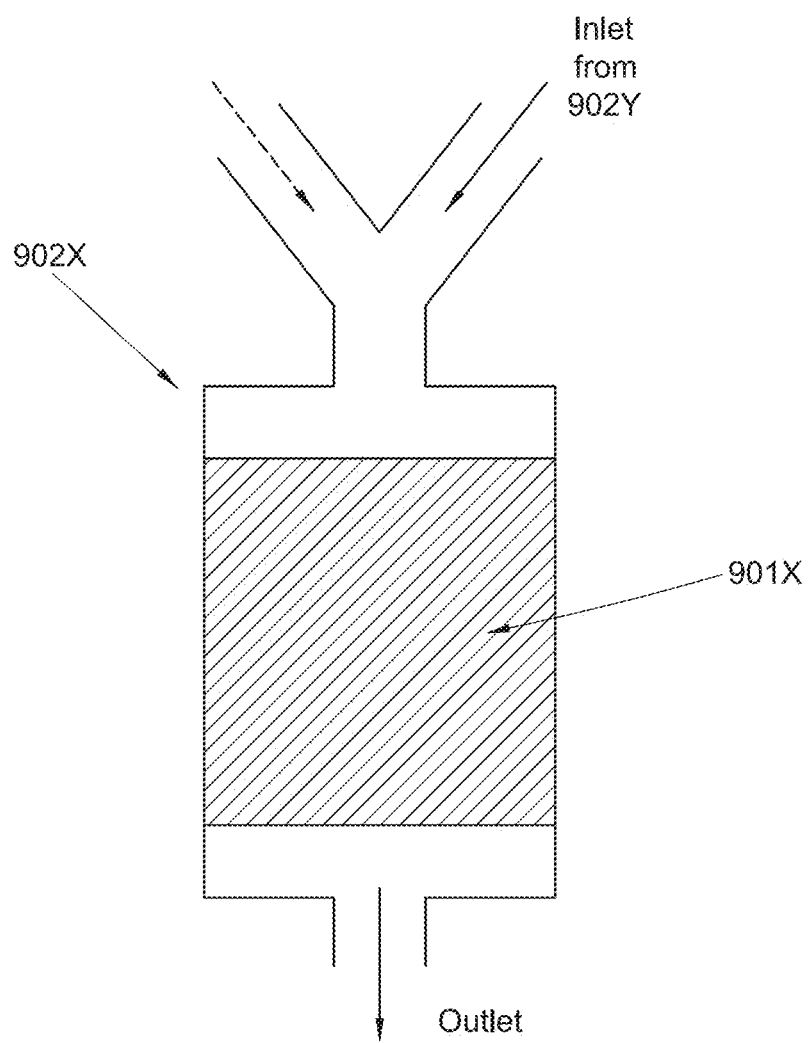
FIG. 10 is a schematic illustration of an example embodiment of a filter, as illustrated in the filtration system of FIG. 9, in accordance with the disclosure herein.

In the embodiment of a filtration system illustrated in FIG. 9, contaminated wastewater flows through the inlet valve to the inlet of filter 902Y for a first stage of filtration. After exiting the first stage of filtration in filter 902Y, the treated water is tested in a water tester at the outlet of filter 902Y. If the water is below a specified threshold concentration level, this "clean" water is discharged. In this embodiment, the water tester at the outlet of filter 902Y has an internal valve. If the concentration level of contaminants remains above the threshold, then the water is routed, via the internal valve of the water tester at the outlet of 902Y, to the inlet of filter 902X for a second stage of filtration rather than to the inlet of filter 902Z/902-alpha. After the second stage filtration in filter 902X, the water is tested again in a second water tester. If the water contamination level is below a specified threshold concentration level, this "clean" water is discharged. If the concentration level of contaminants remains above the threshold, then the water is routed to the inlet of filter 902Z/902-alpha for a third stage of filtration. After the third stage filtration in filter 902Z/902-alpha, the water is tested again in a second water tester. As was described above, if the water contamination level is below a specified threshold concentration level, this "clean" water is discharged. If the concentration level of contaminants remains above the threshold, then the water is routed back to the inlet of the filtration system. In the illustration of FIG. 8, broken lines are used to illustrate flow paths that are inactive, with no fluid flowing therethrough as a result of the configuration of the valves in the example filtration system being illustrated. FIG. 9 shows an example filter 902X with multiple inlets, as is employed in the example embodiment of the filtration system shown and described in FIG. 10. Just as in FIG. 5, the filter 902X has a housing with an inlet and outlet on opposite sides thereof, with a filtration media 901X being inserted inside of the housing for filtering contaminants out of a wastewater stream entering the housing through the inlet. However, as seen in FIG. 10, the inlet for filter 902X is bifurcated, with one branch being in fluid communication with the outlet of filter 902Y and the other branch being connected to the inlet of the filtration system. The connection scheme illustrated in FIG. 10 can be applied equally to modify any of filters 902Y and/or 902Z, as desired based on contaminants being removed from the wastewater. Additionally, the outlets can be bifurcated in a similar manner, whether to bypass the respective water testers or for some other purpose which would be understood by those having ordinary skill in the art.

The first field study was conducted to review the performance of 901X media. The study was conducted at a plant making transmissions and associated parts for trucks. The water being treated in this study is the wastewater generated by the plant's zinc-phosphate electrocoat (E-coat) paint line. The water generated by this process is contaminated with latex paint solids, metal fines and other particulate debris. The water also contains dissolved metals that cannot be discharged into the environment without further treatment. The metals in question are Manganese (Mn), Zinc (Zn) and Nickel (Ni). The water to be treated fluctuates but is always above the limits required for safe discharge. The sample chosen is representative of the most problematic conditions the plant faces. Both the feed quality and filtered quality are listed in the study summation.

The current treatment design is a four-step process which involves chemical precipitation, followed in order by a back-washable 40 cubic foot sand filter, a back-washable 40 cubic foot Micro-Z filter, and duplex 50 cubic foot Activated Carbon filters that were utilizing bone-char as an enhancement to metal removal. System flow was an average of 125 gallons per minute during operation 8 to 12 hours per day. The filtration rate of this study duplicated exactly the filtration loading rate of the current operation conditions, which is approximately 1.33 gallons per minute per square foot. Therefore, operating at this flow rate using 901X filter media has apples-to-apples comparison to the current three step filtration process.

The results after one pass through 901X media are as follows:

| CONTAMINANT | UNTREATED | AFTER 901X | % REMOVAL |
|---|---|---|---|
| TSS (Particulates) | 241 mg/l | 11 mg/l | 95.4% |
| Manganese (Mn) | 10.1 | 1.1 mg/l | 89.1% |
| Zinc (Zn) | 0.52 mg/l | 0.05 mg/l | 90.3% |
| Nickel (Ni) | 1.172 mg/l | 0.014 mg/l | 98.8% |
| pH | 8.71 | 6.25 | Not Applicable |

901X demonstrated in a single pass, superior contaminant removing capability to a four-step process involving chemical precipitation, filtration sand, Micro-Z (Watts San Antonio, TX) media, and Bone Char Granulated Activated Carbon. In addition to superior metals removal, 901X also delivered sediment and particulate removal in that same, single step. It must be noted that further treatment with a combination of 901Y, Z and/or alpha would deliver even greater removal of contaminants with strong indication of being able to reuse this now discarded wastewater. Raw water contaminant levels assessment in comparisons with existing water system to 901X. The data tables show contaminant levels after the existing four—step treatment system and one pass with 901X filter media.

| 901X Technology Test | | | |
|---|---|---|---|
| Existing Technology | | 901X Technology Test | |
| pH | 7.45 | pH | 6.26 |
| TSS | 22 TSS mg/l | TSS | 11 TSS mg/l |
| Mn | 1.43 mg/l | Mn | 1.1 mg/l |
| Zn | 0.13 mg/l | Zn | 0.05 mg/l |
| Ni | 0.048 mg/l | Ni | 0.014 mg/l |

The second study was the wastewater from recycling and reconditioning polymer using plastic recycler. The water being treated in this example is the wastewater having by unacceptable lead contamination. Local discharge requirements are 0.25 mg/l. In addition to the wastewater lead the high amounts of suspended solids causes the water to be almost opaque and black in color. Because of these contaminant problems this water is not suitable for discharge to drain, nor is it economical for reuse. The current treatment design is a five-step process which involves first raising the pH with caustic soda, then adding an aluminum-based coagulant to precipitate dissolved metals (mostly lead). The treated water is then run into a carbon/silica-based gravity filter and then passed through at disposable 1-micron filter. The final step in the process is to send the water to a filter press to make-waste "cake" and squeeze the remaining water out and pass it to the drain.

This study used 901X/901Y combination. The results after one pass through 901X/901Y media are:

| CONTAMINANT | UNTREATED WASTE | CURRENT TREATMENT | TREATMENT WITH 901X/901Y |
|---|---|---|---|
| Lead | 78.1 mg/l | >2.0 mg/l (97.4%) | 0.737 mg/l (99%) |
| Color | Black-Opaque | Black-Opaque | Clear, light hue |
| Weight of "Cake" | N/A | >55 lb./cubic ft. | <4 lb./cubic ft. |

Testing of 901X presents the ability to eliminate costly, toxic chemicals and to provide delivering a water-clear end-product. 901X with 901Y makes possible both the recycling and discharge to sewer, wastewater that currently struggles to meet discharge regulations. Additionally, with a base weight of only 1.2 pounds per cubic ft. 901X dramatically reduces the weight and volume of material that is sent to landfill.

The third study was a company that generated metal-bearing wastewater, as a result of placing corrosion resistant coatings and the finishing on a variety of spring products. The finishes range from powder coating to anodizing to chrome. Metals in the rinse-waters are too high in heavy metals to be sent to the city sewer system. The metals that require reduction/removal are Zinc, Copper, Nickel, and Chromium.

The current treatment design is a multiple-step process which involves first raising the pH with caustic soda, then adding an aluminum-based coagulant to precipitate dissolved metals (mostly lead). The treated water is then run into a carbon/silica-based gravity filter and then passed through a disposable 1-micron filter. At times, portable exchange tanks with deionization resin are used to meet discharge limits. The final step in the process is to send the water to a filter press to make-waste "cake" and squeeze the remaining water out and pass it to the drain. The results after one pass through 901X media (%=removal efficiency) are:

| CONTAMINANT | UNTREATED WASTE | CURRENT TREATMENT | TREATMENT WITH 901X |
|---|---|---|---|
| Chrome | 6.11 mg/l | *8.16 mg/l (−33.5%) | 0.120 mg/l (98%) |
| Copper | 0.298 mg/l | 0.080 mg/l (73.1%) | 0.017 mg/l (94.3%) |
| Nickel | 0.057 mg/l | *0.71 mg/l (−88.6%) | <0.005 mg/l (99%) |
| Zinc | 122 mg/l | 146 mg/l (−19.6%) | 0.100 g/l (99%) |

Testing of a single-pass through 901X produced superior results in metals removal. Replacement of current technology with 901 media design eliminates multiple stages of chemical addition, settling, filter press stages, and final-stage polishing deionization.

A fourth study was conducted to demonstrate the ion exchange functionality of 901X media. After the initial test, to demonstrate the reversible-regenerable property of the 901 X media, the media in the columns were rinsed with DI water, reversed (regenerated) with 10% Hydrochloric acid, again rinsed with deionized water, and finally reversed (regenerated) with the original recipe of 5% Sodium Bicarbonate. Testing was conducted on both Hexavalent Chromium and Copper. Stock solutions (known concentrations) of Hexavalent Chromium at 100 ppm, and divalent copper at 2.5 mg/l were passed through fresh 125 ml columns of fresh 901X media that was regenerated/charged with sodium ions by passing 20 bed volumes of 5% Sodium Bicarbonate over the media. The columns were packed at the bottom with a glass wool fabric to prevent the media from escaping into the test solution. The bottom of the columns had a TEFLON (Chemours, Wilmington DE) stopper to control the on/off flow through the columns. Once charged with sodium ions, the media was thoroughly rinsed with high-purity deionized water in excess of 10 megohm-cm-cm, until there was a non-detectable amount of sodium coming off the columns. Instrumentation and Measurement: To detect the presence/absence of metals Hach colorimetric test kits were used. Sodium does not yield a colorimetric result and must be measured by a more elaborate instrument such as Atomic Absorption/Photometry or specific ion electrode analysis. The methods of measurement are as follows: Hach Model CH 14 Chromium Test Kit—Chromium Measurement; Hach Model CU-6 Test Kit—Copper Measurement; Horiba Model LAQUATwin Na-11 Portable Ion-Electrode Pen—Sodium detections. The results are shown in the table below.

TABLE A

CHROMIUM TEST-FIRST PASS-INITIAL SODIUM CHARGE

| Chromium Before Filtration | Chromium After Filtration | Sodium Before Filtration | Sodium After Filtration |
|---|---|---|---|
| 75 mg/l | ND | 0 mg/l (ND) | 105 mg/l |

TABLE B

CHROMIUM TEST-SECOND PASS-SECOND SODIUM CHARGE

| Chromium Before Filtration | Chromium After Filtration | Sodium Before Filtration | Sodium After Filtration |
|---|---|---|---|
| 75 mg/l | ND | 0 mg/l (ND) | 92 mg/l |

TABLE C

COPPER TEST-SECOND PASS-SECOND SODIUM CHARGE

| Copper Before Filtration | Copper After Filtration | Sodium Before Filtration | Sodium After Filtration |
|---|---|---|---|
| 2.5 mg/l | ND | 0 mg/l (ND) | 3.2 mg/l |

TABLE D

COPPER TEST-SECOND PASS-SECOND SODIUM CHARGE

| Chromium Before Filtration | Sodium After Filtration | Chromium Before Filtration | Sodium After Filtration |
|---|---|---|---|
| 2.5 mg/l | ND | 0 mg/l (ND) | 4.7 mg/l |

These test results confirm both the reversible (regenerable) nature of 901X media and its ion exchange properties. The absence of the contaminant metal in the post-filtration stage couple with a new presence of sodium in the filtrate demonstrates the media exchanging sodium for both chromium and copper during the filtration process. Furthermore, the subsequent metal removal tests on the second pass through the same media sample indicates a simple, quick reversibility (regenerability) property of the 901X media.

A fifth study was conducted to demonstrate the ion exchange functionality of 901 alpha media. The Industry Standard method of expressing ion exchange capacity is the grains per cubic foot convention. As an example, common water softening resin is routinely advertised as offering 30,000 grains removal capacity per cubic foot. See Water Conditioning and Purification Magazine, C. F. Michaud, MWS, Mar. 20, 2017—Defining and Measuring Capacity (herby incorporated by reference in its entirety.) By industry standards set by the Water Quality Association, and others, one grain of contaminant is defined as 17.1 mg/l (or parts per million) of contaminant. Id. Michaud. The accepted formula for determining ion exchange capacity of a media is:

Capacity=(Feed Water Concentration)×(gallons of throughput until exhaustion) In our equations we used this nomenclature. Id. Michaud.

C=Capacity in grains of 901-Alpha (This is our unknown)
N=Concentration of feed solution (Chromium and Copper samples)
V=Volume of filtrate obtained before contaminant passed through the 901-Alpha sample Chromium Concentration N=4.38Grains(75 mg/l÷17.1 mg/l–per grain capacity)

Copper Concentration N'=0.146Grains(2.5 mg/l÷17.1 mg/l–per grain capacity)

The 10-gram sample size of 901-Alpha=0.001 cubic ft of media (Based on general density of 22 pounds per cubic foot density)

To determine the cubic foot representation of the 901-Apha sample used for testing the following data was applied.

D=Density (D) of 901-Alpha=22 pounds per cubic foot)
S=Sample Volume in Pounds=0.22 pounds (10 grams sample=0.22 pounds)
R=Sample Size, Translated into cubic ft.=0.001 cubic ft Determining the cubic foot sample size was achieved through the equation:

S÷D=R Specifically 0.022 pounds of media÷22 pounds/cubic ft=0.001cubic ft

The equation to determine capacity is C=N×V However, in our testing we used only a 0.001 cubic foot sample of 901-Alpha. To convert this capacity per 0.001 cubic foot to the universal capacity expressed in grains per cubic the result was multiplied by a factor of 1,000. The equations for translating the capacity test into the conventional grains/cubic foot is: C=N×V×1,000. Id. Michaud. To determine the capacity of 901-Alpha required continuing to feed the contaminant solutions (N) into the testing column until they could be found in the outflow (filtrate) of the testing column. At that point, the maximum capacity of the 901-Alpha was consumed. By measuring and recording how much volume (V) the column passed before it exhausted, the second variable could be identified allowing the solving of the unknown variable capacity (C). Instrumentation and Measurement: To detect the presence/absence of metals Hach colorimetric test kits were used. Sodium does not yield a colorimetric result and must be measured by a more elaborate instrument such as Atomic Absorption/Photometry or specific ion electrode analysis. The methods of measurement are as follows.

Hach Model CH 14 Chromium Test Kit—Chromium Measurement
Hach Model CU-6 Test Kit—Copper Measurement
Horiba Model LAQUATwin Na-11 Portable Ion-Electrode Pen—Sodium detection. Palintest Photometer 7500).

Tables of Results

TABLE A

CAPACITY TEST #1-INITIAL PASS-INITIAL CHROMIUM FEED

| Chromium Concentration of Feed Solution (N) | Volume of Throughput to Achieve Media Exhaustion (V) | Media Capacity C = N × V × 1000 |
|---|---|---|
| 4.38 grains/gallon | 0.867 gal or 3255 ml | 3,797 grains per cubic ft. |

Calculation: (4.38 grains/gallon)×(0.867 gallons)×(1000) =3,800 grains per cubic ft capacity

TABLE B

CAPACITY TEST #2-SECOND PASS-REGENERATED 901-ALPHA

| Chromium Concentration of Feed Solution (N) | Volume of Throughput to Achieve Media Exhaustion (V) | Media Capacity C = N × V × 1000 |
|---|---|---|
| 4.38 grains/gallon | 0.921 gal or 3,486 ml | 4,033 grains per cubic ft. |

Calculation: (4.38 grains/gallon)×(0.921 gallons)×(1000) =4,033 grains per cubic ft capacity Table C.1

CAPACITY TEST #1-INITIAL PASS-INITIAL COPPER FEED

| Copper Concentration of Feed Solution (N) | Volume of Throughput to Achieve Media Exhaustion (V) | Media Capacity C = N × V × 1000 |
|---|---|---|
| 0.146 grains per gallon | 28.81 gal or 10.902 ml | 4,206 grains per cubic ft |

Calculation: (0.146 grains/gallon)×(28.81 gallons)×(1000)=4,206 grains per cubic ft capacity

TABLE D

CAPACITY TEST #2-SECOND PASS-REGENERATED 901 ALPHA

| Copper Concentration of Feed Solution (N) | Volume of Throughput to Achieve Media Exhaustion (V) | Media Capacity C = N × V × 1000 |
|---|---|---|
| 0.146 grains per gallon | 29.55 gal or 11.859 ml | 4,314 grains per cubic ft |

Calculation: (0.146 grains/gallon)×(29.55 gallons)×(1000)=4,314 grains per cubic ft capacity. Conclusions: The test results found in tables A, B, C, and D consistently delivered an expected ion-exchange capacity of about 4,000 grains per cubic foot of 901-Alpha. The term about means plus or minus ten percent.

A sixth study evaluated efficiency based on time to remove a containment such as a heavy metal. This study showed a method to increase the removal efficiency of a containment from an aqueous solution by passing the aqueous solution through an activated carbon filtration media made of a plurality of non-particulate rice husk fibers, such as 901-alpha along with a solution of tartaric acid (1.2 molarity) and/or soda bicarbonate (5%) can achieve 99% removal, wherein the contact time between the aqueous solution through an activated carbon filtration media is no more than 2 minutes. This short contact time is much faster than the conversional activated carbon adsorption and normal ion exchange time at a couple of hours. See Sani Abdulrazak, Evaluation of removal Efficiency of Heavy Metal by low-cost activated Carob Prepared from African Palm Fruit, Applied Water Science V. 7, issue 6 (October 2017).

The above study embodiments are intended to be illustrative in nature, and nothing described hereinabove is to be construed as a limitation regarding other configurations and embodiments which are otherwise within the scope of the subject matter disclosed herein. Other such embodiments of the current invention will be apparent to those skilled in the art from a consideration of this specification or practice of the invention disclosed herein. Thus, the foregoing specification is considered merely exemplary of the current invention, with the true scope thereof being defined by the following claims.

We claim:

1. A method to regenerate an activated carbon filtration media comprising:
    providing an activated carbon filtration media, wherein the activated carbon filtration media consists of: activated partially charred rice husks, having a silicon content of not greater than 40 percent, a range from between about 0.1-2 mm in length, have a specific surface area of between 400-500 m$^2$/g, and have a porosity between 0.4 to 0.55; and
    contacting the activated carbon filtration media with an aqueous solution containing a plurality of heavy metals to remove a heavy metal from the aqueous solution;
    regenerating the activated carbon filtration media by washing the charred rice husks with an aqueous acid solution; and
    passing the aqueous solution through the regenerated carbon filtration media to further remove heavy metals from the aqueous solution.

2. The method of claim 1, wherein the heavy metal is copper and the activated carbon filtration media has an ion exchange capacity of 13 mg/g of the activated carbon filtration media.

3. The method of claim 1 wherein the heavy metal is zinc and the activated carbon filtration media has an ion exchange capacity of 5.4 mg/g of the activated carbon filtration media.

4. The method of claim 1 wherein the heavy metal is nickel and the activated carbon filtration media has an ion exchange capacity of 16.3 mg/g of the activated carbon filtration media.

5. The method of claim 1 wherein the heavy metal is lead and the activated carbon filtration media has an ion exchange capacity of 8.6 mg/g of the activated carbon filtration media.

6. The method of claim 1 wherein the heavy metal is chromium and the activated carbon filtration media has an ion exchange capacity of 55.5 mg/g of the activated carbon filtration media.

7. The method of claim 1 further comprising the steps of pressing the aqueous solution from the activated carbon filtration media to form a waste cake, wherein the waste cake has a filtration media density of between approximately 0.7 to approximately 2.0 pounds per cubic foot (lb/ft$^3$).

8. The method of claim 1 further comprising the step of contacting the activated carbon filtration media with a solution of tartaric acid while contacting the activated carbon filtration media with the aqueous solution containing the plurality of heavy metals to increase the efficiency of removal of the heavy metal from the aqueous solution.

9. The method of claim 1 further comprising the step of contacting the activated carbon filtration media with a solution of sodium bicarbonate (5%) while contacting the activated carbon filtration media with the aqueous solution containing the plurality of heavy metals to increase the efficiency of removal of the heavy metal from the aqueous solution.

* * * * *